Sept. 1, 1925.

J. M. LEA 1,552,320

BATTERY MOUNTING

Filed Sept. 7, 1920

Inventor
John M. Lea
Attorneys
Blackmore, Spencer & Flint.

Sept. 1, 1925.  1,552,320
J. M. LEA
BATTERY MOUNTING
Filed Sept. 7, 1920  2 Sheets-Sheet 2
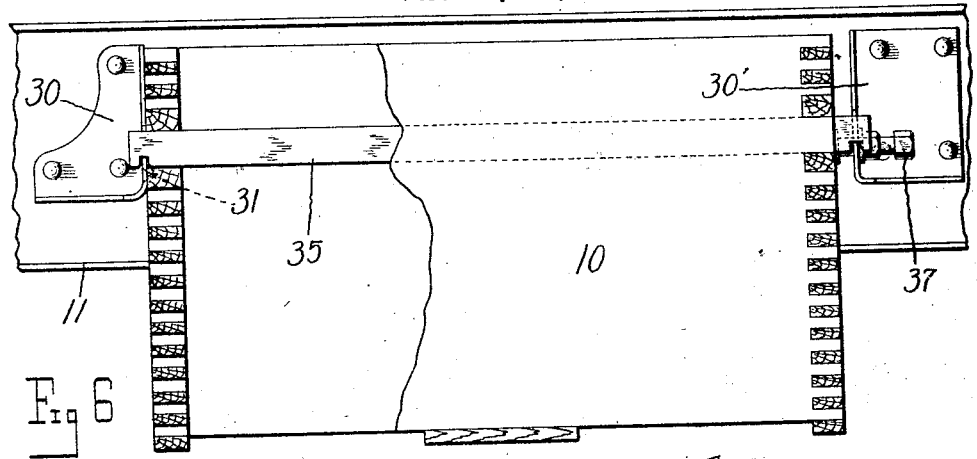
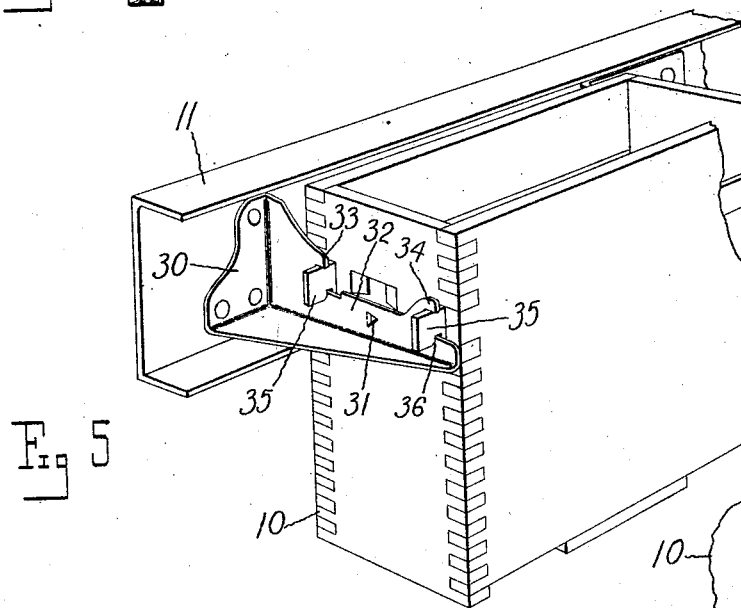
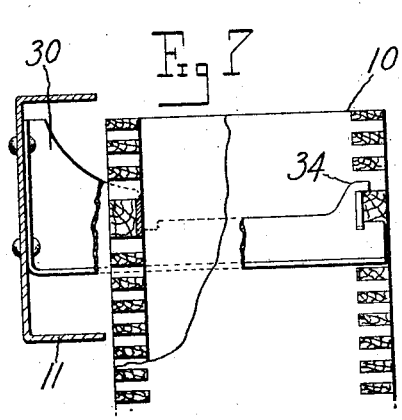
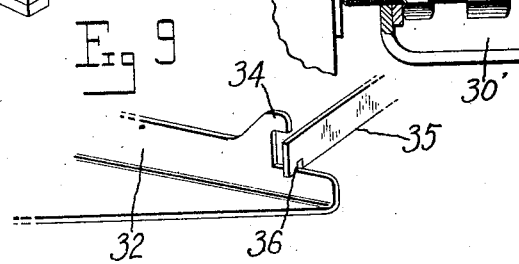
Inventor
John M. Lea
By Blackmore, Spencer & Flint
Attorneys Patented Sept. 1, 1925.

1,552,320

UNITED STATES PATENT OFFICE.

JOHN M. LEA, OF DETROIT, MICHIGAN, ASSIGNOR TO GENERAL MOTORS CORPORATION, OF DETROIT, MICHIGAN, A CORPORATION OF DELAWARE.

BATTERY MOUNTING.

Application filed September 7, 1920. Serial No. 408,750.

*To all whom it may concern:*

Be it known that I, JOHN M. LEA, a citizen of the United States, and a resident of Detroit, county of Wayne, and State of Michigan, have invented certain new and useful Improvements in Battery Mountings, of which the following is a full, clear, concise, and exact description, such as will enable others skilled in the art to which the invention relates to make and use the same, reference being made therein to the accompanying drawings, which form a part of this specification.

The invention relates to supporting devices and more especially to those of the type designed for supporting or suspending a box or like receptacle. While in no way limited thereto I have contemplated the use of the structure for mounting upon vehicle frames the portable storage batteries ordinarily employed for ignition, starting and lighting in connection with motor vehicles driven by internal combustion engines.

The primary object of my invention is to provide a simple and inexpensive construction whereby one or more bars adapted to receive an object to be supported or suspended may be engaged with brackets or the like in such manner as to be securely locked or held against movement in any direction relative to the said brackets.

A further object is to provide means whereby a receptacle, such as a battery box, may be suspended from a structure such as a frame member of a vehicle, in such manner as to be easily and quickly attached or removed and securely maintained in the desired position notwithstanding the shocks and vibration incident to the usual operation of automobiles.

With the above and other objects in view, as will more fully appear from the following description, the invention consists in the features of novelty hereinafter described and set forth in the claims hereto appended.

In the accompanying drawings in which are illustrated some embodiments of my invention—

Figs. 5, 6 and 7 are respectively a perspective view, a side elevation and an end elevation of a modified form of support.

Fig. 8 is a fragmentary view of a detail of the securing means and

Fig. 9 is a perspective view of a detail corresponding to Fig. 4.

Figure 1:
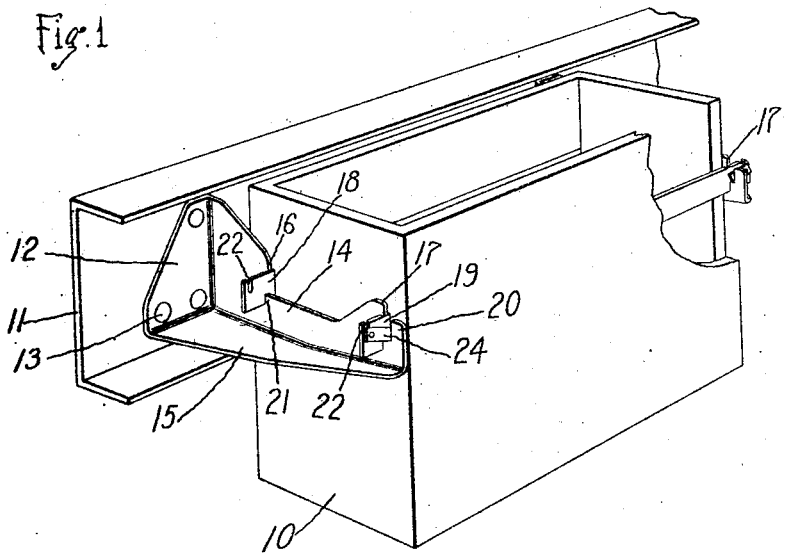
Fig. 1 is a perspective view showing a box or like receptacle supported from a member of channel form.

Referring to the drawings, 10 indicates an article to be supported, shown in this instance as a receptacle with rectangular sides. A frame or supporting structure 11, illustrated as a channel bar of the kind ordinarily employed as side members in an automobile chassis, has secured thereto, as by rivets 13, the bracket members 12.

The bracket member which may extend horizontally for the required distance in accordance with the proportions of the receptacle to be supported, is formed with a flange 14 arranged in substantially a vertical plane and a flange 15 in substantially a horizontal plane, thus providing great rigidity to resist strains tending to distort the bracket in any direction. However, the form of the bracket members and of their supporting means may be varied widely within the scope of the invention.

Figure 2:
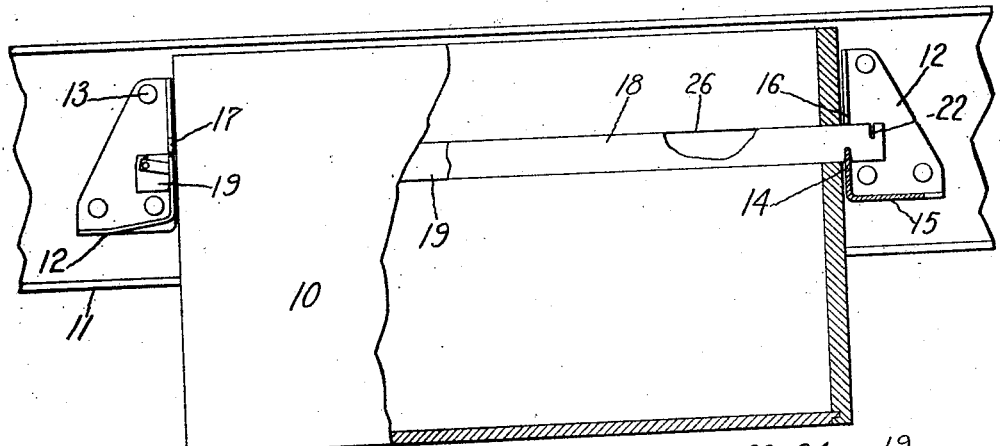
Fig. 2 is a side elevation and Fig. 3 an end elevation, both being partly in section, of the structure shown in Fig. 1.
Figure 3:
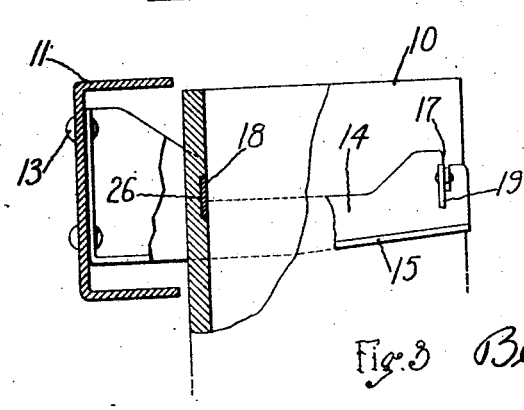
Figure 4:
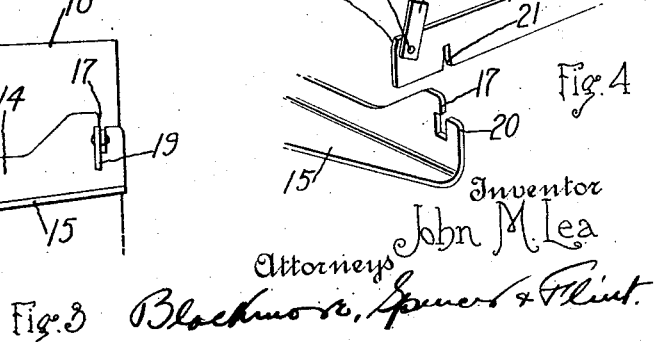
Fig. 4 is a perspective view of a detail of the supporting means.

The flange 14, which provides seats for the bars 18, 19 or 35 hereinafter described, is shown as having upwardly and forwardly extending portions or projections 16 and 17 which form shoulders overhanging the said seats on the flange and under which shoulders may be engaged the bars 18 and 19 respectively. In the form shown in Figs. 1 to 4 the forward end of the flange 14 is also provided with an upwardly projecting portion 20 spaced forwardly of the shoulder 17 so that a bar 19 may be lowered behind the portion 20 and then pushed rearwardly under the shoulder 17.

The bars 18, 19, which may be stamped or otherwise formed from sheet material are made as duplicates for convenience in manufacture and are provided with notches 21 on one edge near each end, and on the other edge, immediately adjacent to the end, with notches 22. The notches 21 are designed to engage over and be seated upon the flanges 14 thus preventing longitudinal movement of the bar with reference to the brackets. The notch 22 is designed to receive the pivot pin 23 of a detent 24.

As shown the pivot pin 23 may be inserted in the notch 22 and a blow of a hammer or the like upon the corner of the bar as at 25 will be sufficient to close the notch over the pin.

Any other suitable securing means for the detent may be employed but the means illustrated has been selected because of its cheapness and convenience of manufacture.

The detent 24 will be mounted ordinarily only upon the bar 19 and is intended to fit closely behind the projection 20 when the bar 19 has been pushed rearwardly under shoulder 17 to the limit of its movement. When the parts have been thus positioned it will be obvious that the bar 19 and the parts supported thereby will be held against movement in any direction relatively to the brackets.

If the bar 18 is prevented from movement independently of the bar 19, as by connection to the same article, then it is, of course, unnecessary to provide the bar 18 with any retaining means other than the notch 21 and the shoulder 16.

In the form illustrated the bars 18 and 19 are passed through the receptacle 10, preferably lying in grooves 26 in the interior of the receptacle and extending through holes in the ends thereof. It will be seen that the notches 21 will also afford means for engagement with bails or the like if it be desired to carry the receptacle from place to place.

In the modified construction illustrated in Figs. 5 to 9 the bracket 30 may be similar to brackets 12 except for the omission of the part 20 and the addition of an inwardly extending tooth or pointed projection 31 which may be struck up or otherwise formed upon the vertical flange of the bracket. Upon this flange 32 are formed the forwardly extending shoulders 33 and 34 similar to the portions 16, 17 of Fig. 1. The bars 35 are in this case provided with notches 36 on the lower edge corresponding in position and function to the notches 21 in bars 18, 19.

The bracket 30' at the opposite end of the receptacle differs from bracket 30 in having in place of projection 31, a set screw 37 adapted to engage in a threaded aperture 38 in the bracket and provided with a lock nut or the like as at 39.

In this form of the invention the box or like article to be supported will be placed in position with the notches in the bars 35 engaging over the flange 32, and then pushed backwardly until the bars have reached their limit of movement under the shoulders 33, 34, the set screw 37 being withdrawn sufficiently to permit free movement of the box past the end of the screw and the tooth 31. Finally the screw may be turned up to force the box into firm engagement with the tooth 31, the box being thus held against movement in any direction relatively to the supporting means. A reversal of these operations will permit the receptacle to be readily removed if desired, as, for example, in the removal of battery boxes for storage, repair, or replacement.

It will be understood that various changes in details of construction may be made without departing from the spirit and scope of the invention and therefore I do not desire to be limited to the specific structure above described.

I claim:

1. In a device of the class described, a bracket having seats and shouldered portions overhanging said seats, an article to be supported having projecting portions adapted to engage said seats and lie under said overhanging portions, and inter-engaging means on said article and bracket adapted to prevent movement of said article away from said overhanging portions.

2. In a supporting device the combination of a main supporting member, a bracket attached thereto, said bracket having seats and projections overhanging said seats, an article having a plurality of bars extending therefrom and adapted to engage said seats and lie under said projections, and means for preventing movement of said bars away from said projections.

3. In a supporting device, a bracket, a receptacle, a plurality of bars supporting receptacle and seated on said bracket, said receptacle and seated on said bracket, inter-engaging means on said bars and bracket adapted to prevent movement of said bars relatively to said bracket vertically and longitudinally, and inter-engaging means on said bracket and receptacle adapted to prevent movement of said bars and receptacle vertically and laterally relatively to said brackets.

4. In a supporting device, a frame member, a pair of brackets fixed thereto and extending laterally therefrom, said brackets each having a vertical flange providing seats and projections overhanging said seats, a pair of bars having notched ends adapted to lie on said seats and under said projections with said flanges engaging in said notches, and means to prevent movement of said bars away from said projections.

5. In a supporting device, a receptacle, bars extending through said receptacle and having their ends projecting beyond the walls of said receptacle, the lower edges of said projecting portions being provided with means adapted to engage and retain bails or the like to thereby support the weight of the receptacle.

6. In a supporting device, a receptacle having internal grooves, bars lying in said grooves and extending through the ends of said receptacle, the ends of said bars having recesses formed on their lower edges, and brackets adapted to receive the ends of said bars and engage said recesses.

In testimony whereof I affix my signature.

JOHN M. LEA.